United States Patent
Nguyen et al.

(10) Patent No.: US 9,918,009 B2
(45) Date of Patent: Mar. 13, 2018

(54) METHOD AND SYSTEM FOR IMAGING IN A LUMINAIRE

(71) Applicant: GE Lighting Solutions, LLC, East Cleveland, OH (US)

(72) Inventors: Vinh-Loc Nguyen, Lachine (CA); Gleb Geguine, Lachine (CA); Tai-Peng Tian, Niskayuna, NY (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 14/816,351

(22) Filed: Aug. 3, 2015

(65) Prior Publication Data
US 2017/0041535 A1   Feb. 9, 2017

(51) Int. Cl.
| | |
|---|---|
| H04N 5/247 | (2006.01) |
| H04N 5/232 | (2006.01) |
| G03B 15/03 | (2006.01) |
| G08B 13/196 | (2006.01) |
| H04N 5/225 | (2006.01) |
| H05B 37/02 | (2006.01) |
| G06K 9/00 | (2006.01) |
| G03B 29/00 | (2006.01) |
| G03B 37/04 | (2006.01) |

(52) U.S. Cl.
CPC ......... *H04N 5/23238* (2013.01); *G03B 15/03* (2013.01); *G03B 29/00* (2013.01); *G03B 37/04* (2013.01); *G06K 9/00771* (2013.01); *G08B 13/1963* (2013.01); *G08B 13/19641* (2013.01); *H04N 5/2253* (2013.01); *H04N 5/2256* (2013.01); *H04N 5/2257* (2013.01); *H04N 5/247* (2013.01); *H05B 37/02* (2013.01)

(58) Field of Classification Search
USPC .......................................................... 396/429
See application file for complete search history.

(56) References Cited

U.S. PATENT DOCUMENTS

| | | | |
|---|---|---|---|
| 3,586,278 A * | 6/1971 | Simons | F16M 11/12 248/121 |
| 5,497,188 A | 3/1996 | Kaye | |
| 5,886,738 A | 3/1999 | Hollenbeck et al. | |
| 6,462,775 B1 | 10/2002 | Loyd et al. | |
| 6,462,811 B1 * | 10/2002 | Turner | G01B 11/00 348/125 |
| 6,536,961 B1 | 3/2003 | Gillies | |
| 6,590,643 B2 * | 7/2003 | Kubota | G01J 1/04 356/121 |
| 6,624,845 B2 | 9/2003 | Loyd et al. | |
| 6,782,123 B1 * | 8/2004 | Guillon | G01C 11/06 250/336.1 |
| 6,834,960 B2 * | 12/2004 | Dbjay | G03B 15/00 352/243 |
| 7,051,356 B2 | 5/2006 | Weinstein | |

(Continued)

FOREIGN PATENT DOCUMENTS

| | | |
|---|---|---|
| WO | 2014140356 | 9/2014 |
| WO | 2014140357 | 9/2014 |

*Primary Examiner* — Clayton E Laballe
*Assistant Examiner* — Linda B Smith
(74) *Attorney, Agent, or Firm* — Peter T. DiMauro; GE Global Patent Operation (57) ABSTRACT

There is provided a luminaire that includes a plurality of cameras supported by a member. One camera has a field of view overlapping the field of view of another camera.

14 Claims, 4 Drawing Sheets

(56) References Cited

U.S. PATENT DOCUMENTS

| | | | |
|---|---|---|---|
| 7,110,104 B2* | 9/2006 | Choi | G01N 21/8806 356/237.1 |
| 7,309,965 B2 | 12/2007 | Dowling et al. | |
| 7,358,498 B2 | 4/2008 | Geng et al. | |
| 7,643,748 B2* | 1/2010 | Cameron | G03B 17/561 359/391 |
| 7,961,234 B2* | 6/2011 | Viinikanoja | H04N 13/0239 348/218.1 |
| 7,990,422 B2 | 8/2011 | Ahiska et al. | |
| 8,007,126 B2 | 8/2011 | Hemby | |
| 8,405,732 B2 | 3/2013 | Ahiska et al. | |
| 8,622,561 B2 | 1/2014 | Carmody | |
| 8,678,680 B1* | 3/2014 | Pelini | F16M 11/06 224/275 |
| 8,938,161 B2 | 1/2015 | Webb et al. | |
| 2003/0138247 A1* | 7/2003 | Trunz | G03B 37/04 396/325 |
| 2007/0146530 A1* | 6/2007 | Nose | G03B 37/04 348/335 |
| 2008/0158341 A1* | 7/2008 | Gelsomini | G03B 37/04 348/36 |
| 2011/0141727 A1* | 6/2011 | Kim | F21S 8/086 362/234 |
| 2011/0228086 A1* | 9/2011 | Cordero | G08B 13/19636 348/143 |
| 2014/0267778 A1 | 9/2014 | Webb et al. | |
| 2014/0288694 A1 | 9/2014 | Wagner et al. | |
| 2014/0333774 A1* | 11/2014 | Hsu | H04N 5/2251 348/159 |
| 2014/0354821 A1 | 12/2014 | Monroe | |
| 2015/0077614 A1 | 3/2015 | King | |
| 2015/0124100 A1* | 5/2015 | McRory | H04N 7/185 348/151 |

* cited by examiner

METHOD AND SYSTEM FOR IMAGING IN A LUMINAIRE

FIELD OF THE INVENTION

The present disclosure generally relates to luminaires. Particularly, the present disclosure relates to imaging in a luminaire.

BACKGROUND OF THE INVENTION

Image distortion can be caused by optical effects originating from a lens of a camera that acquired the image. However, it could also be caused by inadequate positioning of the camera with respect to the scene being imaged. In the former case, the distortion is optical because it is an aberration caused by the lens' physical parameters. In the latter case, the distortion is simply referred to as perspective distortion.

In luminaires that have a camera mounted therein, a large field of view is typically desired to image a large portion of a roadway, a sidewalk, a park, or generally speaking, an area around the luminaire. This is typically achieved using a wide angle lens, which inherently introduces optical distortion. In a wide angle lens camera, the field of view of the lens is much larger than the size of the image sensor of the camera. As such, the image appears squeezed to fit the pixel array of the sensor. In the distorted image, straight lines appear curved, with the effect being more extreme at the edges of image.

While a large field of view is desired for a camera mounted in a luminaire, performing video or image analytics on a distorted image may not yield relevant information. For example, running traffic estimation algorithms (or any other image analytics) on the edge of a distorted frame may not yield accurate results. Thus, video or image post-processing methods are not effective without mitigating the field-of-view versus distortion trade-off.

Furthermore, when a camera is used in a luminaire, a desired result can be the monitoring of specific areas of a scene, rather than the whole field of view. For example, using a camera in the luminaire, one may wish to simultaneously monitor car parking spots, crosswalks, building entrances, etc. that are in the vicinity of the luminaire or far away from the luminaire. This requirement has usually been addressed with a camera having a wide angle lens in order to capture the whole scene, and this solution is prone to optical distortion as well, as explained above.

Another option has also been to use distributed cameras, each acquiring a small image of the scene to subsequently stich all the small images together in order to obtain a large image representative of the whole scene. This solution is not only computationally intensive, since a plurality of images have to be put together, but it may also be prone to distortion when a particular area of interest is far away from the luminaire, in which case a wide angle must be used in at least one of the distributed cameras.

SUMMARY

The embodiments featured herein help mitigate at least the above-noted deficiencies. Specifically, the embodiments of the present disclosure provide a large field of view camera system for producing substantially distortion-free images. Further, the embodiments allow the monitoring of a plurality of distinct areas of a scene, without the need to stitch smaller images together to obtain a larger image.

In one embodiment, a luminaire includes a plurality of cameras. The luminaire includes a member supporting the plurality of cameras. Further, a first camera of the plurality of cameras has a field of view that overlaps with a field of view of a second camera of the plurality of cameras.

In another embodiment, a luminaire includes a plurality of cameras. The luminaire includes a member supporting the plurality of cameras. Further, a first camera of the plurality of cameras has a field of view separated by a predetermined angle with respect to a field of view a second camera of the plurality of cameras. Furthermore, the predetermined angle is smaller or equal to an interpolation angle.

In yet another embodiment, there is provided a method of retrofitting a luminaire. The method includes mounting a pod on a body of the luminaire and connecting electronics disposed in the pod to electronics included in the luminaire. The pod can include a plurality of cameras, a member supporting the plurality of cameras. A first camera of the plurality of cameras can have a field of view overlapping with a field of view of a second camera of the plurality of cameras.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION OF EMBODIMENTS OF THE PRESENT INVENTION

Figure 1:
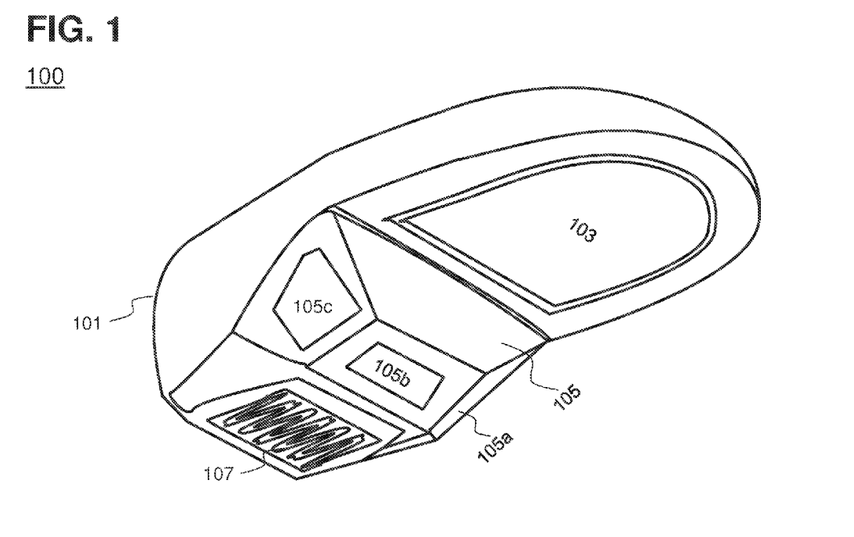
FIG. 1 is an illustration of a luminaire according to an exemplary embodiment.
Figure 2A:
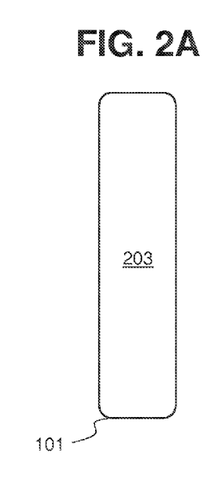
FIGS. 2A-2D are illustrations of various luminaire shapes that may be used with the exemplary embodiments.
Figure 2B:
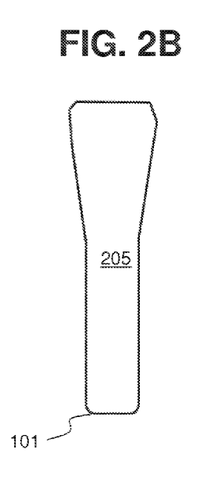
Figure 2C:
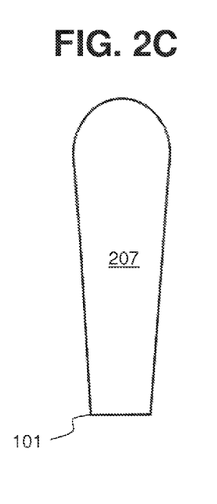
Figure 2D:
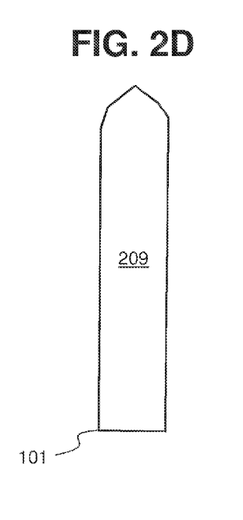

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure FIG. 1 is an illustration of a cobra head-shaped luminaire 100 according to an exemplary embodiment. Luminaire 100 includes a body 101 representing an outer portion of a housing. Glass 103 transmits light from a bank of light-emitting diodes or one or more lamps included within the body 101 of luminaire 100. Other functional components within the luminaire 100 are also included within the body 101. For example, and not by limitation, these components can include reflectors, power supplies, and as shall be seen in the exemplary embodiments, a plurality of cameras. The body 101 also includes a fin 107 configured to manage the thermal properties of luminaire 100. Fin 107 can be simple corrugations disposed in the body 101 and acting as a heat sink. Luminaire 100 also includes a transparent (clear or tinted) glass or plastic for transmitting light. Further, luminaire 100 includes a pod 105 having a plurality of transparent windows, such as windows 105a, 105b, and 105c.

Windows 105a, 105b, and 105c are positioned to provide side and nadir views for a plurality of cameras within the pod 105. For example, when luminaire 100 is mounted on a pole (not shown), a camera located inside pod 105 may have a field of view directed to the left side of luminaire 100 through window 105c. Similarly, a camera may have a field of view directed to the right side of luminaire 100 through window 105a. Also, a camera can have a field of view directed underneath luminaire 100, i.e. in the nadir direction, through window 105b. Furthermore, in some embodiments, the number of cameras within the pod 105 may equal the number of windows.

Field of view, as used herein, denotes the angle subtended by the lens of the camera. For example, and not by limitation, a wide angle lens can be a lens that has a field of view in the range of about 60 degrees to about 80 degrees. Generally speaking, however, a wide angle lens can be any lens that has a field of view susceptible of creating distortion in an image when used with a particular camera.

Further, while pod 105 is shown to be mounted on luminaire 100 of a specific shape, other luminaire shapes may be used. One of skill in the art will readily recognize that pod 105 can be appropriately shaped to fit onto the luminaire's body, regardless of the luminaire's body shape. Other luminaire shapes that are known in the art and that can be used in the context of the present disclosure are shown in FIGS. 2A-2D.

Figures 4, 5:
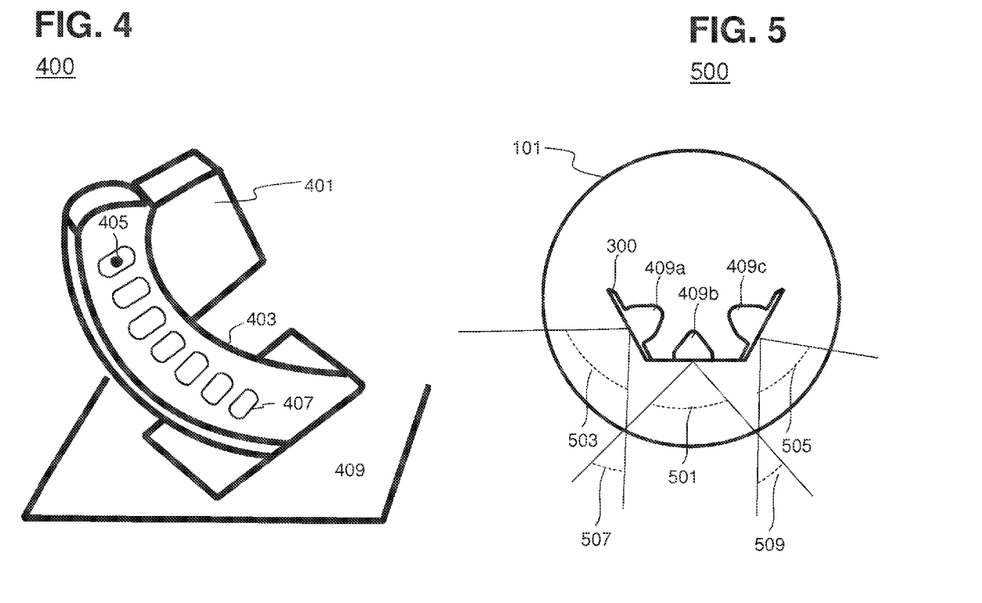
FIG. 4 is a more detailed illustration of a component of the member shown in FIG. 2.
FIG. 5 is an illustration of a luminaire according to an alternative embodiment.

For example, as depicted in FIGS. 2A-2D, the body 101 can be a rounded rectangle shape 203, horn shaped 205, a "skinny cobra" shape 207, or bullet shaped 209. While only these four shapes are shown, one of skill in the art will readily appreciate that body 101 can have other shapes without departing from the scope of the present disclosure. Furthermore, while FIGS. 1 and 2A-2D relate only to pole-mounted luminaires, other types of luminaire can be used. For example, as shown in FIG. 5, post top luminaires can also be used.

Figure 3:
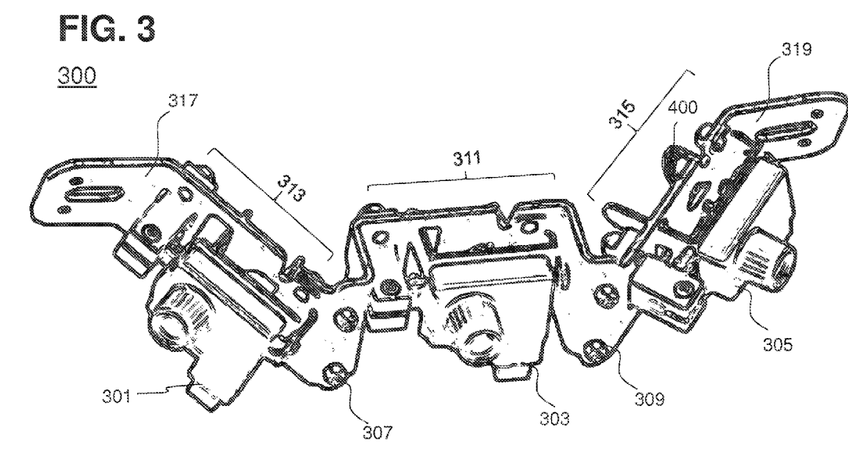
FIG. 3 is an illustration of a member for mounting a plurality of cameras according to an exemplary embodiment.

FIG. 3 is an illustration of a member (or rig) 300 according to an embodiment. Member 300 is configured for mounting a plurality of cameras (e.g. camera 301, camera 303, and camera 305). Member 300 can include three sections (311, 313, and 315), each supporting one or more cameras. For example, section 311 supports camera 303, section 315 supports camera 305, and section 313 supports camera 301. The sections can be joined to one another by bolts (like bolts 307 and 309), screws, pins or the like. Member 300 can include fewer or more than three sections, thereby allowing fewer or more than three cameras to be mounted thereon. Further, member 300 can be fixed onto an inner surface of body 101 at extremities 317 and 319, using bolts, screws, pins or the like.

Each section of member 300 includes, on a rear side, an adjustable member 400 (shown only in section 315 for clarity). Adjustable member 400 allows camera 305 to pivot at a pitch angle with respect to the plane of the camera (i.e., tilt forward or backward). Furthermore, on a front side of each of sections 311, 313, and 315, the platform on which the camera is mounted can be a positioning stage allowing movement in the roll and yaw directions. This means that member 300 is adjustable by design. Further, in some embodiments, each of or one or more of sections 311, 313, and 315 can be configured to provide a translation motion of a camera in one of a vertical and a lateral direction or in both directions. This can be achieved by provided a set of rails (in the vertical and/or lateral directions) onto which the camera can move and be secured.

As such, positioning stages and adjustable members 400 can function to adjust the relative positioning of one camera with respect to another, thus making their respective field of views overlap by an angle determined by the positioning. In other embodiments, only one of cameras 301, 303, and 305 can have pitch, roll, and yaw degrees of freedom while the other cameras remain in fixed position. Still, in other embodiments, a subset of all the cameras mounted on the member can have multiple degrees of freedom. In yet other embodiments, all the cameras can have pitch, roll, and yaw movement capability.

FIG. 4 is an illustration of adjustable member 400 according to an embodiment. Adjustable member 400 includes a fixed portion 401 attached to the frame of member 300. FIG. 4 also shows an extending platform 409 of member 300. Platform 409 includes an opening through which a moveable portion 403 of adjustable member 400 passes. Moveable portion 403 is attached at one end to a platform supporting camera 305 on the front side of member 300. At its other end, moveable portion 403 can be secured to fixed portion 401 using a pin and slot system. Specifically, moveable portion 403 includes a plurality of slots 407.

In the exemplary embodiment of FIG. 4, the top slot is used to secure moveable portion 403 to fixed portion 401 using a pin 405. By way of example, the slots 407 can be disposed at a fixed distance from one another. In other embodiments, however, the slots 407 can be disposed at arbitrary distances from one another.

One of skill in the art will readily appreciate that moveable portion 403 can have more or fewer slots than those shown in FIG. 4. Further, in another embodiment, moveable portion 403 can have one slot extending along the length of moveable portion 403. This arrangement provides a means for continuous adjustment of the pitch angle of the camera, as opposed to the discrete adjustment capability provided by the embodiment of FIG. 4.

FIG. 5 is a top view of a lower portion of a post luminaire 500 having a circular body 101, with member 300 mounted therein. The lighting elements can be mounted in a top portion (not shown) of luminaire 500. In FIG. 5, platforms 409a, 409b, and 409c are used to mount member 300 to a surface located at the base of luminaire 500. Furthermore, in FIG. 5, considering the above-discussion relating to FIGS. 3 and 4, the field of view of the cameras can be adjusted using adjustable members 400 and the positioning stages supporting the cameras on the front side of member 300.

For example, at least one degree of freedom (i.e. yaw, roll, and pitch) of one camera can be adjusted to overlap the field of view of another. The position of a camera having field of view 503 can be adjusted to make its field of view overlap with that of a camera having field of view 501. The overlap is quantified by an overlap angle 507. Either or both of the cameras can be adjusted to produce the overlap angle 507. Similarly, the positioning of a camera having field of view 505 can be adjusted to produce an overlap angle 509 with respect to field of view 501.

The teachings of the present disclosure allow several advantages. For example, the overlap of field of views 503, 501, and 505 enable the luminaire 500 to cover a total field of view equal to the sums of the field of views 503, 501, and 505. Since no camera has a wide angle lens, distortion, cannot occur. As such, luminaire 500 can have an effective field of view comparable to a field of view of wide angle lens, but without the associated optical distortion.

Further, as shown in the exemplary embodiments above, using three cameras in a cobra head-shaped luminaire or in a post top luminaire, an overlap between the field of view of the cameras can be created. Each camera can be tilted so that the field of view can be adapted to the geometry of a roadway. In some embodiments, the tilt increment is fixed (as provided by the discrete number of slots of adjustable member 400) to minimize mistakes in manufacturing. Further, a module containing the cameras can be removed and replaced without disassembling the luminaire. Existing luminaires can be retrofitted with the module containing the cameras.

In the embodiments, video analytics are more reliable given the absence of optical distortion resulting from the narrow angle lens of the cameras. In some applications, the embodiments provide the ability to accurately analyze images and characterize an image without the numerous false positives typically encountered in camera systems that use wide angle lenses. In addition, the effective field of view of the camera is large enough to allow luminaires to be spaced more sparsely without compromising the size of an area that can be covered by cameras in the luminaires. Further, given the flexibility afforded by the rig onto which the cameras are mounted, the position of each camera can easily be adjusted to yield angles that allow the viewing of all objects of interest in a scene. As such, the embodiments provide the capability of covering all of the objects (e.g. parking spots in a parking lot), rather than obtaining a large stitched image.

Figure 7:
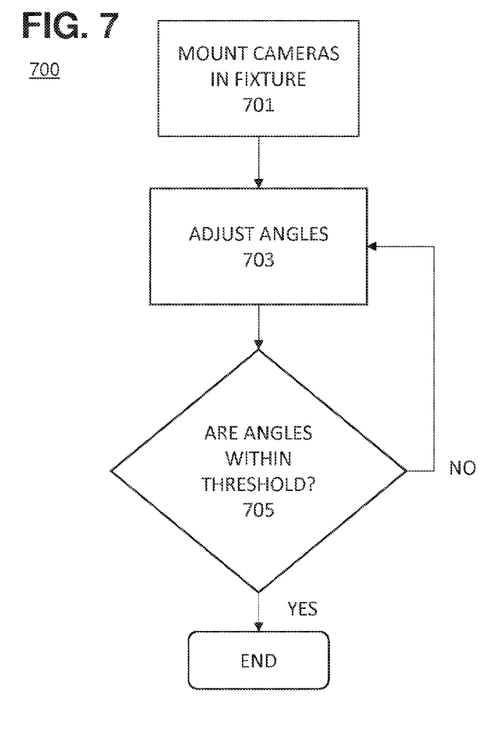
FIG. 7 is a flow chart of an exemplary method of practicing an embodiment.
Figure 8:
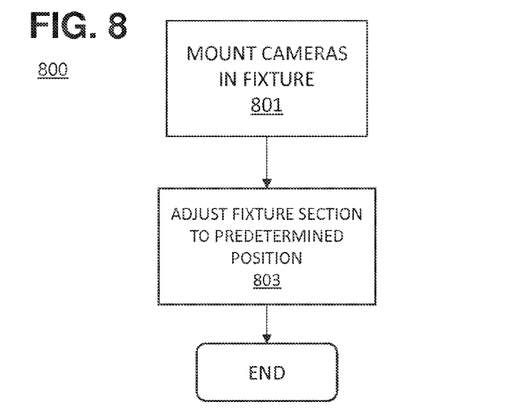
FIG. 8 is a flow chart of an exemplary method according to an alternative embodiment.

FIGS. 6A-D provide an exemplary diagrammatic sequence of covering a roadway segment 600. FIGS. 7 and 8 are flow charts of exemplary methods 700 and 800 illustrating system configuration set ups according to the embodiments.

Figure 6A:
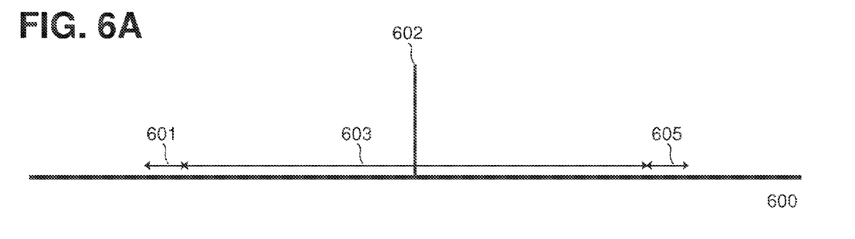
FIGS. 6A-6E are illustrations of a roadway lighting application in which the exemplary embodiments can be used.

FIG. 6A is an illustration of a roadway 600 on the side of which is mounted a pole 602. A luminaire (e.g., luminaire 100 or 500) can be mounted on top of pole 602 to cover a total a segment of roadway 600 given by the sum of the lengths of segments 601, 603, and 605. In contrast to the previously described embodiments, typical luminaires that use a wide angle lens cannot resolve portions of a scene in segments 601 and 605 without optical distortion.

Figures 6B, 6C:
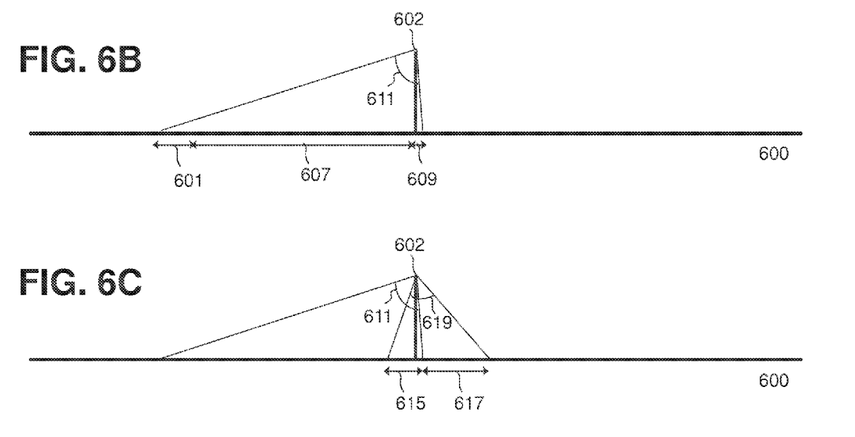

FIG. 6B is an illustration of a field of view 611 subtended by a first camera (e.g., camera 301 in FIG. 3) of the luminaire. The first camera covers, to the left side of pole 602, a segment 607, segment 601, and a small segment 609 on the right side of pole 602. Since the first camera has a narrow angle lens, the segment given by the sum of segments 601, 607, 609 can be imaged without distortion.

Figure 6D:
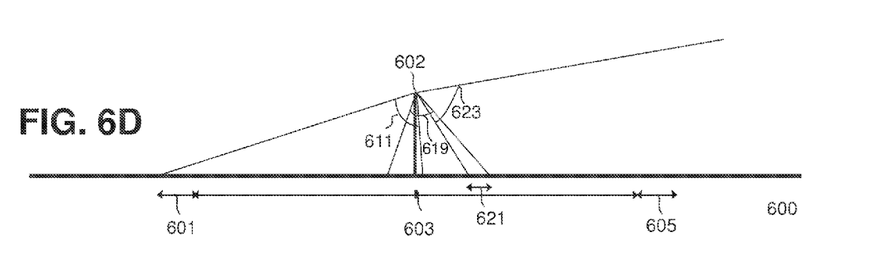

FIG. 6C is an illustration of the overlapping field of view 611 with a field of view 619 of a second camera (e.g., camera 303 in FIG. 3). As such, the second camera covers an overlap segment 615 and a segment 617. FIG. 6D is an illustration showing the overlapping of a field of view 623 of a third camera (like camera 305 in FIG. 3) with field of view 619. As configured, the third camera can image overlap segment 621 as well as the rest of roadway 600, extending to the end of segment 605.

Figure 6E:
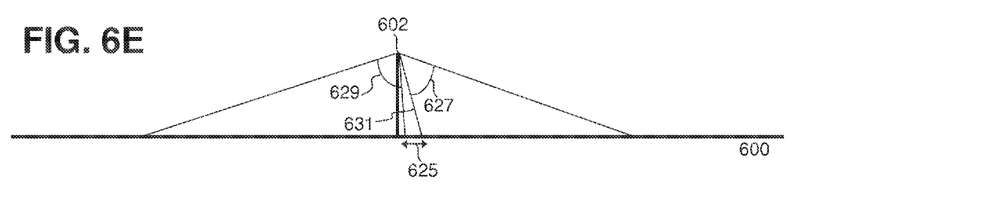

FIG. 6E is another exemplary embodiment of two cameras covering a wide segment of roadway 600. One camera has a field of view 629 and the other camera has a field of view 627. Because these two field of views do not overlap, segment 625 cannot be imaged. Nevertheless, in video analytics or any other image processing application, segment 625 can be interpolated based on the image acquired from both cameras using algorithms known in the art. The separation angle 631 is thus an interpolation angle, i.e. the smallest separation angle at which segment 625 can be recovered with post-processing algorithms. In some embodiments, angle 631 can be between about 0.5 degree and about 8 degrees.

Furthermore, when the field of views the cameras overlap, in post-processing the acquired image (i.e. an image from all of the cameras mounted on the support member) can include identifying objects of interest and discarding all other information or redundant information. For example, if a particular parking spot is of interest, in embodiments where the images from each camera overlap, the redundant information can be discarded as well as information not pertaining to the parking spot of interest. This can easily be achieved since the positioning of each of the cameras is known, thus making some sections of the scene in the overlap portion of the field of views redundant. Any redundant information can thus be discarded since no image stitching is required.

FIG. 7 is a flow chart of an exemplary method 700 according to the embodiments. Method 700 includes a step 701 for mounting a plurality of cameras on a member, such as member 300. A step 705 includes adjusting the overlap angle between the field of view of least one camera and that of another camera.

A decision stage 705 includes determining whether the obtained overlap angle obtained is consistent with a predetermined angle or within a threshold of a predetermined angle. While steps 703 and 705 are discussed above with respect to overlap angles, the method 700 can also be adapted to adjusting separation angles (or interpolation angles) as discussed above with respect to FIG. 6E.

FIG. 8 is a flow chart of an exemplary method 800 according to another embodiment. Method 800 includes a step 801, including mounting a plurality of cameras on a member, such as member 300 in FIG. 3. Step 803 includes adjusting at least one section of the member to a predetermined position to obtain a predetermine angle between field of views of two cameras. This can be accomplished as explained above with respect to FIGS. 3 and 4.

Figure 9:
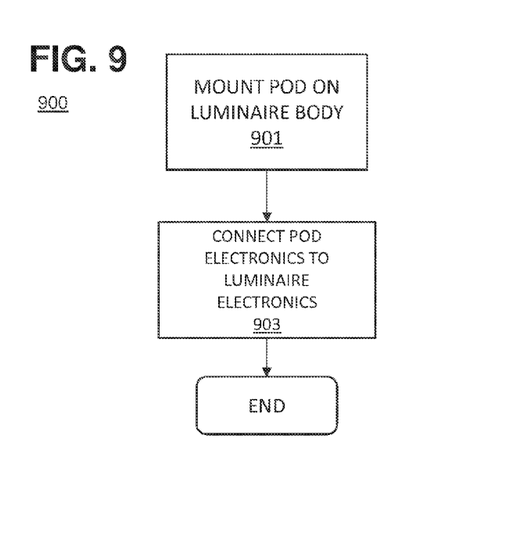
FIG. 9 is a flow chart of an exemplary method according to yet another embodiment.

FIG. 9 is a flow chart of an exemplary method 900 according to yet another embodiment. Method 900 includes a step 901 that includes mounting a pod onto the body of a luminaire in order to provide the luminaire the capabilities described throughout this disclosure. In some embodiments, step 901 can include mounting the pod, or a member like the one shown in FIG. 3, within the luminaire. The pod can be like pod 105, which was discussed above with respect to FIG. 1. Specifically, the pod can include a plurality of cameras and a member supporting the plurality of cameras.

A first camera of the plurality of cameras can have a field of view overlapping with a field of view of a second camera of the plurality of cameras. Furthermore, in other embodiments, step 901 can include mounting several pods like the one described above on and around the body of a luminaire (e.g. a post top luminaire), so as to provide a 360 degree field of view without image distortion. The 360 degree field of view can also be provided by mounting a plurality of support members inside the luminaire.

Method 900 can include another step 903, which includes, once a pod is mounted on or placed within the luminaire, connecting electronics within the pod to electronics in the luminaire. For example, and not by limitation, step 903 can include connecting a camera of the plurality of cameras to a power supply included in the luminaire. One of skill in the art will readily appreciate that any connection from and to the pod is contemplated with respect to step 903.

While the embodiments have been described as manually adjustable systems, in other embodiments, automating the positioning of the cameras can also be done with a computer system. For example, in a luminaire using the exemplary systems, commands may be sent to motors that control any or some of the adjustable mechanisms described above. Moreover, luminaires using the exemplary camera systems can be wirelessly connected to a control center for transmission of images and programming of the camera systems. The luminaires may also have on-board data storage capability. Furthermore, in addition to providing large field of views that yield images substantially free of distortion, the embodiments can also mitigate perspective distortion, because of the highly flexible positioning capabilities provided by the member onto which the one or more cameras are mounted.

Further, as an example, and not by limitation, the field of view of each of the cameras mounted on member 300 can be about 50 degrees. And the field of view of a first camera can overlap the field of view of a second camera by about 25 degrees, and the field of view of a third camera can overlap the field of view of the first camera by about 25 degrees, thus providing an effective field of view of 100 degrees with no distortion, which would not be possible with a wide angle lens having a field of view of 100 degrees. In another example, several members like member 300, each including a plurality of cameras mounted thereon, can be disposed in a post top luminaire to provide a 360 degree field of view, with no distortion.

Furthermore, the embodiments overcome several difficulties encountered when using a camera system inside a luminaire. For example, it can be difficult to place a camera inside a luminaire without having light from the luminaire flood the image sensor of the camera. This is because typical in-luminaire camera systems have fixed positioning, meaning their position cannot be adjusted once they are in the luminaire.

In contrast, in the embodiments disclosed herein, adequate placement of the plurality cameras can be achieved using the wide range of positioning arrangements afforded by the novel support member; the cameras can be positioned so that their image sensors are shielded from the light of the luminaire. Particularly, this is achieved with the pitch, yaw, and roll degrees of freedom of the cameras, in addition to their translation motion capability, in some embodiments. Moreover, the novel support member is a compact rig that can fit within the luminaire, in some embodiments, which causes the luminaire to retain its original esthetic design.

Those skilled in the relevant art(s) will appreciate that various adaptations and modifications of the embodiments described above can be configured without departing from the scope and spirit of the disclosure. Therefore, it is to be understood that, within the scope of the appended claims, the teachings of the present disclosure may be practiced other than as specifically described herein.

What is claimed is:

1. A luminaire, comprising:
   a plurality of cameras;
   a member supporting the plurality of cameras;
   a set of rails;
   wherein the set of rails is configured to provide a translation motion of the plurality of cameras in a vertical direction, lateral direction, or both directions;
   wherein a first camera of the plurality of cameras has a field of view separated by a predetermined angle with respect to a field of view of a second camera of the plurality of cameras; and wherein the predetermined angle is smaller or equal to an interpolation angle; and
   wherein a field of view of a third camera has a field of view separated by the predetermined angle with respect to one of the field of view of the first camera and the field of view of the second camera.

2. The luminaire of claim 1, wherein the member includes an adjustable member configured to position the first camera with respect to the second camera.

3. The luminaire of claim 1, wherein the adjustable member includes a pin and a plurality of slots, the slots being disposed at a fixed distance from one another.

4. The luminaire of claim 1, wherein the member includes three cameras mounted thereon.

5. The luminaire of claim 1, wherein the member is configured to adjust a pitch angle, a yaw angle, and a roll angle of each camera of the plurality of cameras.

6. The luminaire of claim 3, wherein the predetermined angle is obtained by securing the pin in a specified slot.

7. A luminaire, comprising:
   a plurality of cameras including at least a first camera and a second camera;
   a member supporting the plurality of cameras;
   wherein the first camera of the plurality of cameras has a field of view separated by a predetermined angle with respect to a field of view of the second camera, and the field of view of the first camera does not overlap with the field of view of the second camera such that a segment between the respective fields of view cannot be imaged; and
   wherein the predetermined angle is smaller or equal to an interpolation angle that is the smallest separation angle at which the segment can be interpolated with post-processing algorithms.

8. The luminaire of claim 7, wherein the member includes an adjustable member configured to position the first camera with respect to the second camera.

9. The luminaire of claim 7, wherein the adjustable member includes a pin and a plurality of slots, the slots being disposed at a fixed distance from one another.

10. The luminaire of claim 7, wherein the member includes three cameras mounted thereon.

11. The luminaire of claim 7, wherein a field of view of a third camera has a field of view separated by the predetermined angle with respect to one of the field of view of the first camera and the field of view of the second camera.

12. The luminaire of claim 7, wherein the member is configured to adjust a pitch angle, a yaw angle, and a roll angle of each camera of the plurality of cameras.

13. The luminaire of claim 7, wherein the interpolation angle is between about 0.5 degree and about 8 degrees.

14. The luminaire of claim 9, wherein the predetermined angle is obtained by securing the pin in a specified slot.

\* \* \* \* \*